United States Patent
Shimizu et al.

(10) Patent No.: US 7,563,498 B2
(45) Date of Patent: Jul. 21, 2009

(54) CARPET FOR VEHICLES

(75) Inventors: Kazufumi Shimizu, Nara (JP);
Shinsuke Sugie, Nara (JP)

(73) Assignee: Suminoe Textile Co., Ltd., Osakashi (JP)

( * ) Notice: Subject to any disclaimer, the term of this patent is extended or adjusted under 35 U.S.C. 154(b) by 87 days.

(21) Appl. No.: 11/979,502

(22) Filed: Nov. 5, 2007

(65) Prior Publication Data
US 2008/0131647 A1 Jun. 5, 2008

Related U.S. Application Data

(63) Continuation-in-part of application No. 11/134,504, filed on May 23, 2005, now abandoned, which is a continuation-in-part of application No. 10/322,750, filed on Dec. 19, 2002, now abandoned.

(30) Foreign Application Priority Data
Dec. 27, 2001 (JP) ............................. 2001-396240

(51) Int. Cl.
*B32B 3/10* (2006.01)
*B32B 3/18* (2006.01)
*B32B 5/16* (2006.01)
*B32B 5/30* (2006.01)

(52) U.S. Cl. .......................................... 428/95; 428/97

(58) Field of Classification Search ................ 428/95, 428/97
See application file for complete search history.

(56) References Cited

U.S. PATENT DOCUMENTS
3,150,023 A 9/1964 Penman (Continued)

FOREIGN PATENT DOCUMENTS
DE 19622121 7/1997

(Continued)

OTHER PUBLICATIONS

Notification of Reasons for Refusal mailed Oct. 2, 2007, issued on the basic Japanese patent application No. 2001-396240 and its translation.

(Continued)

*Primary Examiner*—Cheryl Juska
(74) *Attorney, Agent, or Firm*—Edwards Angell Palmer & Dodge LLP (57) ABSTRACT

According to one aspect of a preferred embodiment of the present invention, a carpet for vehicles comprises a surface skin layer 2 and a sound absorption layer 3 made of a non-woven fabric integrally bonded to the surface skin layer 2 via an adhesive resin layer 4. The adhesive resin layer 4 is constituted by an air permeable resin layer formed by melting thermoplastic resin powder having a particle diameter of not smaller than 320 μm but not larger than 1,000 μm. An adhered amount of the thermoplastic resin powder is 180 to 500 g/m². Air permeability of the entire carpet in a thickness direction thereof is 10 to 26 cm³/cm²·sec. With this structure, excellent sound absorption performance can be exerted against noise entering into an inside space of a vehicle from the above side, such as, the roof, doors, or windows, as well as noise entering from the lower side.

6 Claims, 2 Drawing Sheets

U.S. PATENT DOCUMENTS

| | | | |
|---|---|---|---|
| 3,150,024 A | | 9/1964 | Penman |
| 3,503,777 A | | 3/1970 | Kappas et al. |
| 3,525,662 A | * | 8/1970 | Padgett et al. ............... 428/96 |
| 3,627,568 A | * | 12/1971 | Padgett et al. ............... 428/87 |
| 3,671,284 A | * | 6/1972 | Uhrig ........................ 427/194 |
| 3,682,738 A | * | 8/1972 | Smith ........................ 156/283 |
| 3,821,066 A | | 6/1974 | Tillotson et al. |
| 4,172,166 A | | 10/1979 | Hartmann et al. |
| 5,849,387 A | | 12/1998 | Drake, Jr. et al. |
| 6,316,075 B1 | | 11/2001 | Desai et al. |
| 6,316,088 B1 | | 11/2001 | Ogawa et al. |
| 6,723,413 B2 | * | 4/2004 | Walters ....................... 428/95 |
| 6,936,201 B2 | * | 8/2005 | Desai et al. ................. 264/112 |
| 7,361,401 B2 | * | 4/2008 | Desai et al. ................. 428/327 |
| 2002/0025414 A1 | * | 2/2002 | Desai et al. ................. 428/195 |
| 2002/0134486 A1 | | 9/2002 | Brumbelow et al. |
| 2003/0152742 A1 | * | 8/2003 | Shimizu et al. .............. 428/95 |
| 2004/0037995 A1 | | 2/2004 | Nicolai et al. |
| 2004/0171763 A1 | | 9/2004 | Van Geenen et al. |
| 2005/0118386 A1 | * | 6/2005 | Desai et al. ................. 428/95 |
| 2005/0136212 A1 | | 6/2005 | Wyerman et al. |
| 2005/0208261 A1 | * | 9/2005 | Shimizu et al. .............. 428/95 |
| 2005/0233106 A1 | | 10/2005 | Imamura et al. |
| 2005/0287335 A1 | * | 12/2005 | Shimizu et al. .............. 428/95 |
| 2008/0131647 A1 | * | 6/2008 | Shimizu et al. .............. 428/87 |

FOREIGN PATENT DOCUMENTS

| | | | |
|---|---|---|---|
| DE | 20009279 | | 9/2000 |
| DE | 10136496 | | 2/2003 |
| EP | 5050 | | 10/1979 |
| EP | 1090973 | | 4/2001 |
| GB | 1106473 | | 3/1968 |
| JP | 59036778 | | 2/1984 |
| JP | 60071255 | | 4/1985 |
| JP | 03023816 | | 1/1991 |
| JP | 06092172 | | 4/1994 |
| JP | 06092172 A | * | 4/1994 |
| JP | 09-076387 | | 3/1997 |
| JP | 10-247085 | | 9/1998 |
| JP | 2000014522 | | 1/2000 |
| JP | 2000-062070 | | 2/2000 |
| JP | 2000-160818 | | 6/2000 |
| JP | 2001-179917 | | 7/2001 |
| JP | 2002172967 | | 6/2002 |
| JP | 2003225153 | | 8/2003 |
| JP | 2003306068 | | 10/2003 |
| JP | 2003341406 | | 12/2003 |
| JP | 2004123090 | | 4/2004 |
| JP | 2005273272 | | 10/2005 |
| JP | 3727308 B2 | * | 12/2005 |
| JP | 2006014994 | | 1/2006 |
| WO | WO-03/053675 | | 7/2003 |

OTHER PUBLICATIONS

European Search Report dated Aug. 30, 2007, issued on the corresponding European patent application No. 02 02 8271.

"Standard Test Method for Impedance and Absorption Materials Using a Tube, Two Microphones and a Digital Frequency Analysis System," ASTM Int'l, E 1050-98, 11 pages.

"US standard mesh sieve sizes and DIN sieve," downloaded from www.themeter.net; 1 page.

* cited by examiner

FIG. 3

CARPET FOR VEHICLES

This is a continuation-in-part application of commonly assigned U.S. patent application Ser. No. 11/134,504 filed on May 23, 2005, now abandoned, which is a continuation-in-part application of commonly assigned U.S. patent application Ser. No. 10/322,750 filed on Dec. 19, 2002, now abandoned.

BACKGROUND OF THE INVENTION

1. Field of the Invention

The present invention relates to a carpet for vehicles, such as, e.g., a floor carpet for use in automobiles, which is capable of securing sufficient quietness by exerting excellent sound absorbency against noise entering into an inside space of a vehicle from the upper side thereof, such as, e.g., a roof, doors and windows, as well as noise entering into the inside space from the carpet-disposed floor side.

In this specification, the wording "air permeability" denotes air permeability measured in accordance with the "A" method according to 8.27.1 of JIS (Japanese Industrial Standard) L 1096-1999.

2. Description of Related Art

The following description sets forth the inventor's knowledge of related art and problems therein and should not be construed as an admission of knowledge in the prior art.

Conventionally, a floor carpet is disposed on an automobile floor for the purpose of obtaining good step feeling and preventing transmission of vibrations of the floor side.

Now, not only vibrations but also external noise are introduced into an inside space of an automobile from an automobile floor. Although external noise passing through a floor can be somewhat reduced by a floor carpet, the noise reduction by the floor carpet was not sufficient. Under the circumstances, a noise absorbable automobile floor carpet has been expected. As such a noise absorbable automobile floor carpet, an automobile floor carpet composed of, for example, a carpet member having pile implanted on the upper surface thereof and a nonwoven fabric noise absorption layer bonded to the lower surface of the carpet member by heat press via an adhesive film is known.

External noise entering into an automobile inside space include not only noise entering via the floor but also noise entering via the roof, doors, windows, etc. Therefore, quietness in an automobile inside space can be fully secured only if such a floor carpet can exert sound absorption effects against such noise.

In the aforementioned conventional automobile floor carpet, however, although excellent sound absorption effects can be expected by existence of the lower noise absorption layer against external noise entering into an automobile inside space via a floor, external noise entering via a roof, doors, windows, etc. can be hardly absorbed by the floor carpet because the noise is bounced by the adhesive film layer of the floor carpet and returned to the automobile inside space.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g. disadvantages and/or advantages discussed herein, while retaining some or all of the features, embodiments, methods, and apparatus disclosed therein.

SUMMARY OF THE INVENTION

The present invention have been developed in view of the above-mentioned and/or other problems in the related art. The preferred embodiments of the present invention can significantly improve upon existing methods and/or apparatuses.

Among other potential advantages, some embodiments can provide a carpet for use in vehicles which is capable of attaining sufficient quietness by exerting excellent sound absorbency against noise entering into a vehicle inside space from the upper side thereof, such as, e.g. a roof, doors and windows, as well as noise entering from the carpet-disposed floor side.

In order to attain the aforementioned objects, the inventors diligently conducted study, and found the fact that the aforementioned desired carpet can be obtained by employing an air permeable resin layer having certain areal weight (weight per unit area) formed by melting and then solidifying thermoplastic resin powder as a resin layer for bonding a surface skin member and a nonwoven fabric sound absorption layer to thereby control the air permeability of the entire carpet in the thickness direction so as to fall within a specified range. Thus, the invertors have completed the present invention.

According to one aspect of a preferred embodiment of the present invention, a carpet for vehicles comprises a surface skin layer and a sound absorption layer made of a nonwoven fabric integrally bonded to the surface skin layer via an adhesive resin layer, wherein the adhesive resin layer is constituted by an air permeable resin layer formed by melting thermoplastic resin powder having a particle diameter of not smaller than 320 μm but not larger than 1,000 μm, wherein an adhered amount of the thermoplastic resin powder is 180 to 500 g/m$^2$, and wherein air permeability of the entire carpet in a thickness direction thereof is 10 to 26 cm$^3$/cm$^2$·sec.

In this carpet, since the nonwoven fabric sound absorption layer is provided at a lower side of the carpet, excellent sound absorbency can be exerted against noise entering from the lower side of the carpet-disposed floor of an automobile. Furthermore, since the adhesive resin layer is formed by melting the thermoplastic resin powder, the resin layer has air permeability. Therefore, noise entering into an inside space of a vehicle from the upper side thereof via, e.g., the roof, doors, windows, etc., passes through the adhesive resin layer and then reaches the nonwoven fabric sound absorption layer to be absorbed. Thus, quietness of the inside space of the vehicle can be attained. Furthermore, since it is set such that the particle diameter of the thermoplastic resin powder is not smaller than 320 μm but not larger than 1,000 μm and the adhered amount of the thermoplastic resin powder is 180 to 500 g/m$^2$, a carpet for vehicles having air permeability of the entire carpet in a thickness direction thereof falling within the range of 10 to 26 cm$^3$/cm$^2$·sec. can be provided assuredly. Furthermore, since the air permeability of the entire carpet in the thickness direction thereof is set to 10 cm$^3$/cm$^2$·sec. or above, noise entered from the upper side can pass through the adhesive resin layer effectively without being bounced by the adhesive resin layer, exerting excellent sound absorbency, which in turn can attain sufficient quietness. In addition, since the air permeability of the entire carpet in the thickness direction is set to 26 cm$^3$/cm$^2$·sec. or less, the carpet can have sufficient air flow resistance against noise entering from the upper side and passing through in the thickness direction. Thus, sound interferential functions of the nonwoven sound absorption fabric 3 can be exerted effectively, resulting in sufficient sound absorption of automobile inside space noise. As explained above, since the air permeability is regulated so as to fall within the aforementioned specific range, excellent quietness can be assuredly secured on any conditions.

Although the aforementioned air permeability of the entire carpet in the thickness direction thereof is a value measured in a state in which the surface skin layer, the adhesive resin layer and the nonwoven fabric sound absorption layer are integrally laminated, the value is greatly reflected by the air permeability of the adhesive resin layer. Therefore, it is generally considered that the air permeability of the entire carpet in the thickness direction thereof is nearly equivalent to that of the adhesive resin layer. Since it is technically difficult to measure the air permeability of the adhesive resin layer independently in the laminated state, the present invention employs air permeability of the entire carpet in the thickness direction thereof.

Although the inventors tried to form an air permeable adhesive resin layer by melting a nonwoven fabric sheet or a net shaped sheet, it was difficult to obtain a resin layer having both outstanding sound absorption performance and high bonding strength.

In the carpet for vehicles according to the present invention, it is preferable that the thickness of the sound absorption layer falls within the range of 0.3 to 15 mm, the areal weight (weight per unit area) of the layer falls within the range of 10 to 1,000 g/m$^2$ and the fineness of the fiber constituting the layer falls within the range of 0.1 to 30 decitex. In this case, sufficient sound absorption performance can be exerted over a broad frequency range covering from a lower frequency to a higher frequency.

As the aforementioned thermoplastic resin powder, it is preferable to use polyolefin series resin powder since it is possible to further improve bonding strength and to enhance recycling.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
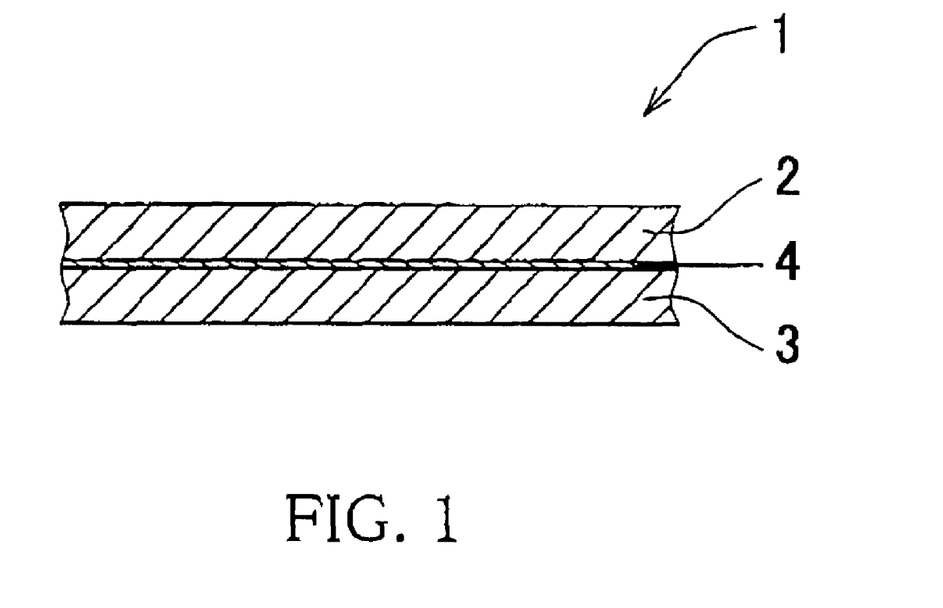
FIG. 1 is a cross-sectional view showing a carpet for vehicles according to an embodiment of the present invention.

As shown in FIG. 1, in a carpet 1 for vehicles according to a preferred embodiment of the present invention, a surface skin layer 2 and a sound absorption layer 3 made of a nonwoven fabric are integrally bonded via an air permeable adhesive resin layer 4 having areal weight of 180 to 500 g/m$^2$ formed by melting thermoplastic resin powder 24 having a particle diameter of not smaller than 320 μm but not larger than 1,000 μm. The air permeability of the entire carpet 1 in the thickness direction thereof is set to 10 to 26 cm$^3$/cm$^2$·sec.

In this carpet 1 for vehicles, since the adhesive resin layer 4 is formed by melting thermoplastic resin powder 24, the adhesive resin layer 4 has air permeability. Furthermore, since the particle diameter of the thermoplastic resin powder 24 is not smaller than 320 at but not larger than 1,000 μm and the adhered amount of the thermoplastic resin powder 24 falls within the range of 180 to 500 g/m$^2$, it becomes possible to control the air permeability of the entire carpet in the thickness direction so as to fall within the range of 10 to 26 cm$^3$/cm$^2$·sec.

The air permeability of the entire carpet 1 in the thickness direction is required to fall within the range of 10 to 26 cm$^3$/cm$^2$·sec. because of the following reasons. If the air permeability is less than 10 cm$^3$/cm$^2$·second, some noise entered into an inside space of a vehicle from the upper side thereof via the roof, windows, doors and the like will be bounced and returned to the inside space of the vehicle without being absorbed by the adhesive resin layer 4. Therefore, sufficient quietness in the inside space of the vehicle cannot be secured. On the other hand, if the air permeability exceeds 26 cm$^3$/cm$^2$·second, it is considered that the air flow resistance of the carpet 1 in the thickness direction decreases, decreasing sound interferential actions of the nonwoven fabric sound absorption layer 3, resulting in insufficient sound absorbency. Thus, for the purpose of assuredly attaining sufficient quietness in a vehicle on any conditions, the air permeability of the entire carpet in the thickness direction is set to the aforementioned specific range. Among other things, it is preferable that the air permeability of the entire carpet in the thickness direction is set to 16 to 26 cm$^3$/cm$^2$·sec.

The particle diameter of the thermoplastic resin powder 24 should be not smaller than 320 μm but not larger than 1,000 μm. If the particle diameter is smaller than 320 μm, it is difficult to control the air permeability of the entire carpet in the thickness direction so as to fall within the range of 10 to 26 cm$^3$/cm$^2$·sec. On the other hand, if the particle diameter exceeds 1,000 μm, it is hard to melt the thermoplastic resin powder 24, resulting in insufficient bonding strength and it becomes difficult to control the air permeability of the entire carpet in the thickness direction so as to fall within the range of 10 to 26 cm$^3$/cm$^2$·sec.

Furthermore, it is required that the adhered amount of the thermoplastic resin powder 24 is controlled so as to fall within the range of 180 to 500 g/m$^2$. If the adhered amount of the thermoplastic resin powder 24 is less than 180 g/m$^2$, it is hard to secure sufficient bonding strength and it becomes difficult to control the air permeability of the entire carpet in the thickness direction so as to fall within the range of 10 to 26 cm$^3$/cm$^2$·sec. On the other hand, if the adhered amount of the thermoplastic resin powder 24 exceeds 500 g/m$^2$, it is difficult to control the air permeability of the entire carpet in the thickness direction so as to fall within the range of 10 to 26 cm$^3$/cm$^2$·sec. Among other things, it is preferable that the adhered amount of the thermoplastic resin powder 24 is set so as to fall within the range of 200 to 450 g/m$^2$.

Furthermore, as the aforementioned thermoplastic resin powder 24, it is preferable to use thermoplastic resin powder falling within the range of 2 to 520 in melt flow rate. On the other hand, if the melt flow rate exceeds 520, the resin penetrates excessively to cause insufficient bonding strength, and therefore it is not preferable. On the other hand, if the melt flow rate is less than 2, it is hard to secure sufficient bonding strength and therefore it is not preferable. This melt flow rate is a value measured in accordance with JIS K6924-2 1997.

The thermoplastic resin powder 24 is not limited to a specific one so long as it is thermoplasticity. For example, polyolefin series resin such as polyethylene, ethylene-polyvinyl acetate (EVA resin), polypropylene, and vinyl chloride resin can be exemplified. Among these resin powder, it is preferable to use polyolefin series resin powder. This resin enhances adhesive strength and recycling. Among the polyolefin series resin powder, the most preferable one is polyethylene powder, which can attain further cost reduction in addition to the aforementioned advantages.

The aforementioned surface skin layer 2 may have pile or may not have pile on the surface thereof, and is not limited to a specific one. As the former example, a carpet comprising a carpet basal member and pile implanted on the surface thereof, a tufted carpet, a woven carpet, a knitted carpet and an electrodeposition carpet can be exemplified. As the latter example, a needle punched nonwoven fabric can be exemplified.

The aforementioned carpet basal member is not limited to a specific one and can be anything. As the carpet base member, a fabric formed by weaving or knitting strings made of synthetic fibers, such as, e.g., polyester fibers, nylon fibers, polypropylene fibers or acrylic fibers, or made of natural fibers, such as, e.g., hemp, cotton or wool, and a nonwoven fabric formed by mechanically connecting or needling various fibers or strings or chemically connecting them with adhesives can be exemplified.

As the aforementioned pile material, it is not specifically limited to a specific one. For example, synthetic fibers, such as, e.g., polyester fibers, nylon fibers, polypropylene fibers, acrylic fibers or rayon fibers, can be preferably used. Natural fibers, such as, e.g., hemp, cotton, wool, can also be used. Furthermore, the method for making the pile layer is not limited to a specific one. The pile layer can be made, for example, by weaving, such as, e.g., warp pile weaving or woof pile weaving, by transplanting pile strings with a tufting machine, by using a knitting-machine for forming a pile layer, or by adhering pile strings using adhesives to form a pile layer. The pile is not required to have a specific configuration, and can be, for example, in the form of cut-pile or loop-pile.

The aforementioned nonwoven fabric constituting the sound absorption layer 3 is not limited to a specific one, and can be any nonwoven fabric. For example, a needle punched nonwoven fabric, a water needled nonwoven fabric, a spanbonded nonwoven fabric or a felt, such as, e.g., a wool felt can be used. The kind of fiber constituting the nonwoven fabric sound absorption layer 3 is not limited to a specific one. For example, polyester fibers, nylon fibers, polypropylene fibers, acrylic fibers or natural fibers can be exemplified.

It is preferable that the thickness of the sound absorption layer 3 falls within the range of 0.3 to 15 mm because of the following reasons. If the thickness is less than 0.3 mm, sufficient sound absorption effect cannot be obtained. On the other hand, if the thickness exceeds 15 mm, the height of the inside space of the vehicle is reduced, which deteriorates the user's feeling of available room in an automobile, and therefore it is not preferable.

It is preferable that the areal weight of the sound absorption layer 3 falls within the range of 10 to 1,000 g/m$^2$ because of the following reasons. If it is less than 10 g/m$^2$, it is difficult to obtain sufficient sound absorption performance. On the other hand, if it exceeds 1.000 g/m$^2$, it is difficult to secure the lightweight performance as a carpet 1 for vehicles.

The fineness of the fiber constituting the sound absorption layer 3 preferably falls within the range of 0.1 to 30 decitex because of the following reasons. If it is less than 0.1 decitex, low frequency noise is not effectively absorbed and the cushion property deteriorates, and therefore it is not preferable. On the other hand, if it exceeds 30 decitex, high frequency noise is not effectively absorbed, and therefore it is not preferable. Among other things, it is more preferable that the fineness of the fiber constituting the sound absorption layer 3 falls within the range of 0.1 to 15 decitex.

In the aforementioned embodiment, no layer is laminated on the lower surface of the sound absorption layer 3. However, the present invention is not limited to this structure. For example, a slip prevention resin layer (for example, a rubber series latex (SBR, etc.) coated layer) can be laminated on the lower surface of the sound absorption layer 3. A plurality of layers can also be laminated on the lower surface of the sound absorption layer as needed. Xn either case, however, it is needless to say that the air permeability of the entire carpet 1 in the thickness direction should fall within the range of 10 to 26 cm$^3$/cm$^2$·sec.

Figure 2:
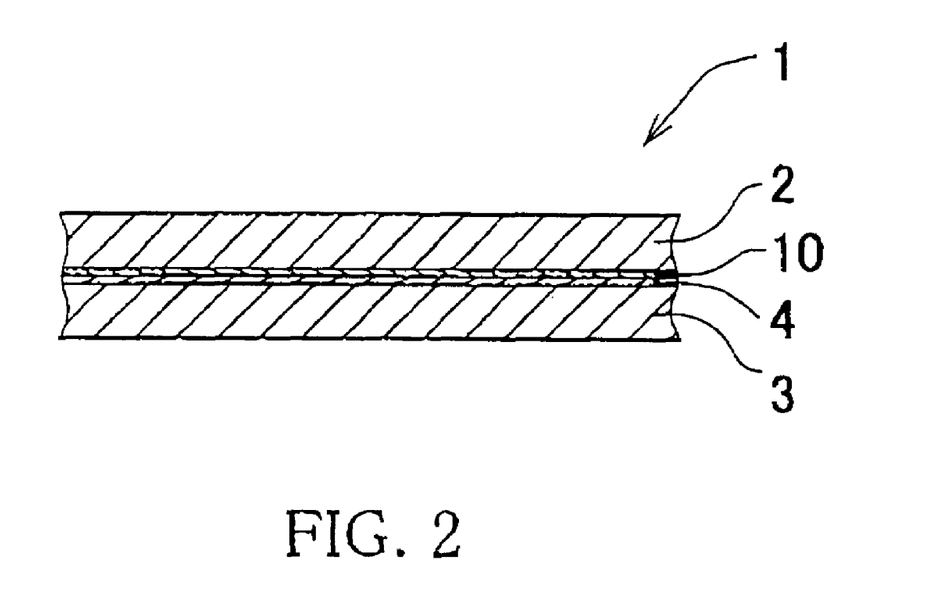
FIG. 2 is a cross-sectional view showing a carpet for vehicles according to another embodiment of the present invention.

Furthermore, as shown in FIG. 2, an additional latex layer 10 can be provided on the lower surface of the surface skin layer 2 to prevent the pile from being pulled out. In other words, an additional latex layer 10 can be disposed between the surface skin layer 2 and the adhesive resin layer 4. In this case, it is also required to design such that the air permeability of the entire carpet 1 in the thickness direction falls within the range of 10 to 26 cm$^3$/cm$^2$·sec.

Figure 3:
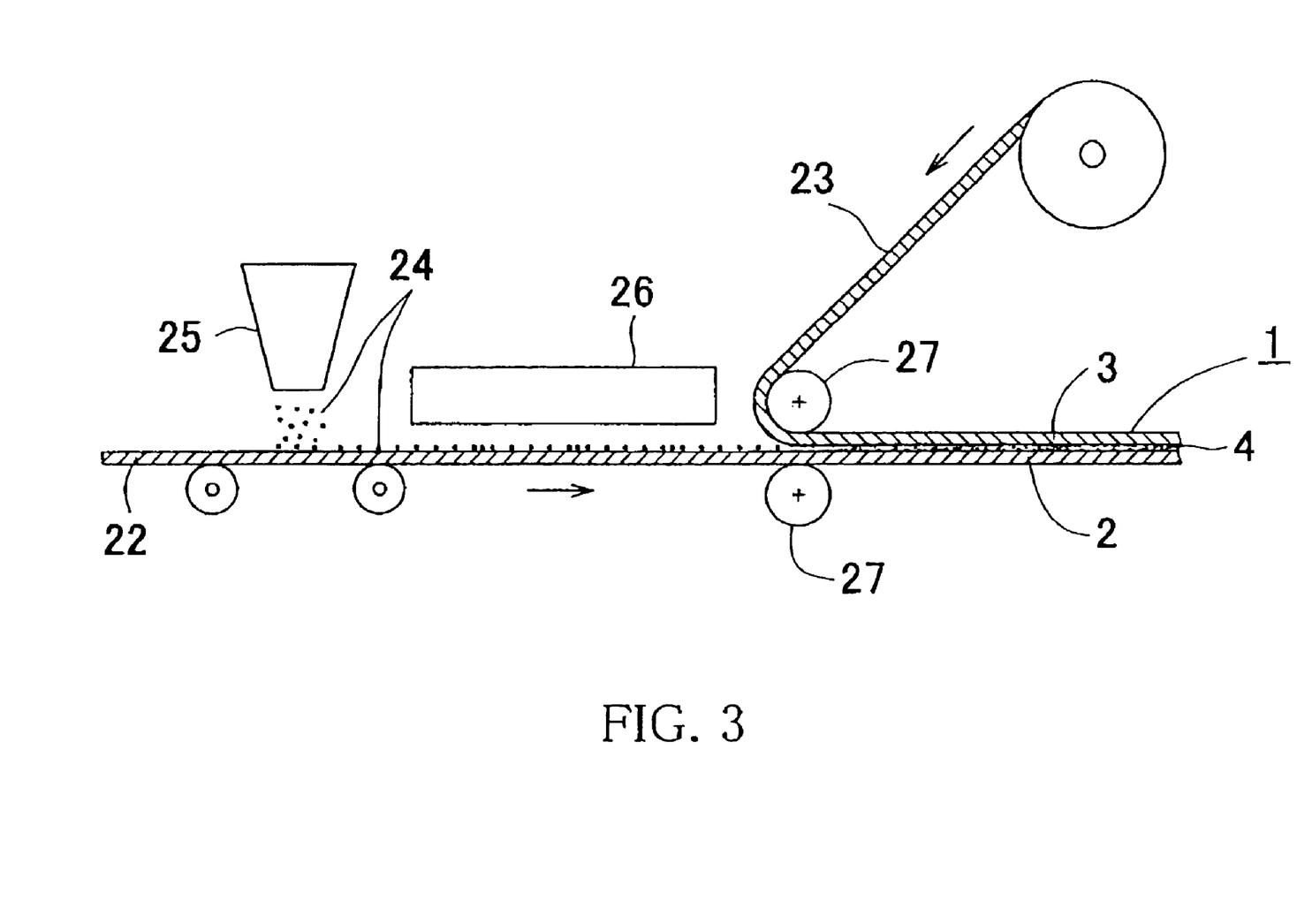
FIG. 3 is a schematic side view showing a method for manufacturing a carpet for vehicles according to the present invention.

A carpet 1 for vehicles according to the present invention can be, for example, manufactured as follows. As shown in FIG. 3, a surface skin member 22 is transferred rightward as shown in FIG. 3 at a constant rate with the laminating side of the surface skin member 22 faced upward, or with the pile side faced downward in the case of a surface skin member 22 having pile.

Then, thermoplastic resin powder 24 is scattered onto the surface skin member 22 from a powder scattering device 25 disposed above the surface skin member 22. In this powder scattering device 25, a roller (not shown) having a number of dimples (dented portions) similar to dimples formed on a surface of a golf ball is disposed at a powder scattering opening formed at the bottom portion of the device 25. In accordance with the rotation of the roller, powder in the dimples is scattered downward. According to this powder scattering device 25, thermoplastic powder stored in the device can be scattered at a desired scattering rate.

Subsequently, the thermoplastic resin powder 24 scattered on the surface skin member 22 is heated and melted using a heating apparatus 26. Thereafter, a nonwoven fabric 23 is disposed thereon and pressed with pressure rollers 27 and 27. Thus, a carpet 1 in which the surface skin member 2 and the nonwoven fabric layer 3 are integrally bonded via an air permeable resin layer 4 is continuously manufactured.

As the pressure rollers 27, cooling pressure rollers can be preferably used. By pressing the layers with cooling pressure rollers, the melted powder can be cooled immediately after the lamination of the layers. Therefore, the solidification of the melted powder can be enhanced, which in turn can enhance the working speed (productivity) and effectively prevent shrinkage of the nonwoven fabric 23 made of thermoplastic fiber and collapse of pile constituting the surface skin layer 22.

In the aforementioned manufacturing method, as the thermoplastic resin powder 24, thermoplastic resin powder having a particle diameter of not smaller than 320 μm but not larger than 1,000 μm is used and the scattering amount of the powder 24 is set so as to fall within the range of 180 to 500 g/m$^2$. With these manufacturing conditions, a carpet for vehicles 1 of the present invention in which the air permeability of the entire carpet in the thickness direction is controlled so as to fall within the range of 10 to 26 cm$^3$/cm$^2$·sec.

Furthermore, in the aforementioned manufacturing method, as for the heating temperature by the heating apparatus 26, it is preferable to control the heating apparatus so that the temperature of the thermoplastic resin at the time of bonding the layers is higher than the melting point of the thermoplastic resin powder 24 by 10 to 70° C. because of the following reasons. If the heating temperature is lower than the lower limit of the aforementioned preferable range, sufficient bonding strength cannot be obtained, resulting in deteriorated durability. On the other hand, if the heating temperature exceeds the upper limit of the aforementioned preferable range, which may have an adverse impact, such as, e.g., heat deterioration, on, e.g., the surface skin layer 2 and/or the sound absorption layer 3.

A carpet 1 for vehicles according to the present invention is not limited to the carpet manufactured by the aforementioned method.

Furthermore, the carpet 1 for vehicles according to the present invention is preferably used as an automobile floor carpet (including a floor carpet shaped in accordance with the floor configuration and a carpet to be disposed thereon) since the carpet 1 has the aforementioned outstanding sound absorption properties. However, the carpet 1 according to the present invention is not limited to an automobile floor carpet, but can be used as, for example, a carpet for use in various vehicles, such as, e.g., railroad vehicles, ships/vessels and aircrafts.

Next, concrete examples of the present invention will be explained.

<Employed Material>

Surface skin material X: Material (pile areal weight: 450 g/m$^2$) formed by tufting pile yarn of nylon fibers in a nonwoven fabric (carpet substrate) of polyester fibers having areal weight of 100 g/m$^2$ Nonwoven fabric Y: Needle punched nonwoven fabric having a thickness of 3.0 mm and areal weight of 300 g/m$^2$ made of polyester fibers of 6.6 decitex Polyethylene powder A: Polyethylene powder having a particle diameter of larger than 330 μm but smaller than 350 μm (obtained by screening polyethylene powder having a wide range of particle diameters to select powder which passed through a screen having an opening diameter of 350 μm but did not pass through a screen having an opening diameter of 330 μm), a melt flow rate of 200, and a melting point of 107° C.

Polyethylene powder B: Polyethylene powder having a particle diameter of larger than 350 μm but smaller than 450 μm (obtained by screening polyethylene powder having a wide range of particle diameters to select powder which passed through a screen having an opening diameter of 450 μm but did not pass through a screen having an opening diameter of 350 μm), a melt flow rate of 200, and a melting point of 107° C.

Polyethylene powder C: Polyethylene powder having a particle diameter of larger than 450 μm but smaller than 500 μm (obtained by screening polyethylene powder having a wide range of particle diameters to select powder which passed through a screen having an opening diameter of 500 μm but did not pass through a screen having an opening diameter of 450 nm), a melt flow rate of 200, and a melting point of 107° C.

Polyethylene powder D: Polyethylene powder having a particle diameter of larger than 500 μm but smaller than 600 μm (obtained by screening polyethylene powder having a wide range of particle diameters to select powder which passed through a screen having an opening diameter of 600 μm but did not pass through a screen having an opening diameter of 500 μm), a melt flow rate of 200, and a melting point of 107° C.

Polyethylene powder E: Polyethylene powder having a particle diameter of larger than 600 μm but smaller than 700 μm (obtained by screening polyethylene powder having a wide range of particle diameters to select powder which passed through a screen having an opening diameter of 700 μm but did not pass through a screen having an opening diameter of 600 μm), a melt flow rate of 200, and a melting point of 107° C.

Polyethylene powder F: Polyethylene powder having a particle diameter of larger than 700 μm but smaller than 900 μm (obtained by screening polyethylene powder having a wide range of particle diameters to select powder which passed through a screen having an opening diameter of 900 μm but did not pass through a screen having an opening diameter of 700 μm), a melt flow rate of 200, and a melting point of 107° C.

Polyethylene powder J: Polyethylene powder having a particle diameter of smaller than 75 μm (obtained by screening polyethylene powder having a wide range of particle diameters to select powder which passed through a screen having an opening diameter of 75 μm), a melt flow rate of 200, and a melting point of 107° C.

Polyethylene powder K: Polyethylene powder having a particle diameter of larger than 270 μm but smaller than 310 μm (obtained by screening polyethylene powder having a wide range of particle diameters to select powder which passed through a screen having an opening diameter of 310 μm but did not pass through a screen having an opening diameter of 270 μm), a melt flow rate of 200, and a melting point of 107° C.

Polyethylene powder L: Polyethylene powder having a particle diameter exceeding 1,000 μm (obtained by screening polyethylene powder having a wide range of particle diameters to select powder which did not pass through a screen having an opening diameter of 1.000 μm), a melt flow rate of 200, and a melting point of 107° C.

Example 1

As shown in FIG. 3, while transferring a surface skin member X (22) at a constant rate with the pile side faced downward, polyethylene powder A (24) was scattered on the surface skin member A (22) at the scattering rate of 250 g/m$^2$ from a scattering device 25. Subsequently, the powder A (24) was heated to 140° C. with a heating apparatus 26 and melted. Thereafter, a nonwoven fabric Y (23) was disposed thereon and pressed with water-cooling-type cooling pressure rollers 27 and 27. Thus, a carpet 1 for vehicles was obtained. The air permeability of this carpet 1 in the thickness direction was 23 cm$^3$/cm$^2$·sec.

Example 2

A carpet 1 for vehicles was obtained in the same manner as in Example 1 except that polyethylene powder B was used as the thermoplastic resin powder in place of the polyethylene powder A.

Example 3

A carpet 1 for vehicles was obtained in the same manner as in Example 1 except that polyethylene powder C was used as the thermoplastic resin powder in place of the polyethylene powder A.

Example 4

A carpet 1 for vehicles was obtained in the same manner as in Example 1 except that polyethylene powder D was used as the thermoplastic resin powder in place of the polyethylene powder A.

Example 5

A carpet 1 for vehicles was obtained in the same manner as in Example 1 except that polyethylene powder E was used as the thermoplastic resin powder in place of the polyethylene powder A.

Example 6

A carpet 1 for vehicles was obtained in the same manner as in Example 1 except that polyethylene powder F was used as the thermoplastic resin powder in place of the polyethylene powder A.

Comparative Example 1

A carpet 1 for vehicles was obtained in the same manner as in Example 1 except that polyethylene powder 3 was used as the thermoplastic resin powder in place of the polyethylene powder A.

Comparative Example 2

A carpet 1 for vehicles was obtained in the same manner as in Example 1 except that polyethylene powder K was used as the thermoplastic resin powder in place of the polyethylene powder A.

Comparative Example 3

A carpet 1 for vehicles was obtained in the same manner as in Example 1 except that polyethylene powder L was used as the thermoplastic resin powder in place of the polyethylene powder A.

TABLE 1

|  | Comp. Ex. 1 | Comp. Ex. 2 | Ex. 1 | Ex. 2 | Ex. 3 | Ex. 4 |
|---|---|---|---|---|---|---|
| Particle diameter of polyethylene powder | Less than 75 μm | Larger than 270 μm but smaller than 310 μm | Larger than 330 μm but smaller than 350 μm | Larger than 350 μm but smaller than 450 μm | Larger than 450 μm but smaller than 500 μm | Larger than 500 μm but smaller than 600 μm |
| Powder adhered amount (g/m$^2$) | 250 | 250 | 250 | 250 | 250 | 250 |
| Air permeability (cm$^3$/cm$^2$ · sec.) | 31 | 27 | 23 | 24 | 23 | 22 |
| Sound absorption rate |  |  |  |  |  |  |
| 1,000 Hz | 0.0968 | 0.0973 | 0.1001 | 0.1021 | 0.1034 | 0.1044 |
| 1,250 Hz | 0.1234 | 0.1267 | 0.1359 | 0.1361 | 0.1368 | 0.1354 |
| 1,600 Hz | 0.1572 | 0.1612 | 0.1775 | 0.1780 | 0.1779 | 0.1770 |
| 2,000 Hz | 0.1967 | 0.2105 | 0.2239 | 0.2267 | 0.2290 | 0.2278 |
| 2,500 Hz | 0.2769 | 0.2874 | 0.3195 | 0.3227 | 0.3264 | 0.3297 |
| 3,150 Hz | 0.3851 | 0.3974 | 0.4438 | 0.4503 | 0.4561 | 0.4516 |
| 4,000 Hz | 0.5271 | 0.5372 | 0.6093 | 0.6146 | 0.6193 | 0.6162 |
| 5,000 Hz | 0.6985 | 0.7017 | 0.7837 | 0.7879 | 0.7927 | 0.8006 |
| 6,300 Hz | 0.8298 | 0.8329 | 0.8874 | 0.8923 | 0.8966 | 0.8876 |
| Bonding strength evaluation | x | x | ○ | ○ | ○ | ○ |

TABLE 2

|  | Ex. 5 | Ex. 6 | Comp. Ex. 3 |
|---|---|---|---|
| Particle diameter of polyethylene powder | Larger than 600 μm but smaller than 700 μm | Larger than 700 μm but smaller than 900 μm | Larger than 1,000 μm |
| Powder adhered amount (g/m$^2$) | 250 | 250 | 250 |
| Air permeability (cm$^3$/cm$^2$ · sec.) | 23 | 25 | 27 |
| Sound absorption rate |  |  |  |
| 1,000 Hz | 0.1018 | 0.0998 | 0.0983 |
| 1,250 Hz | 0.1353 | 0.1358 | 0.1257 |
| 1,600 Hz | 0.1765 | 0.1755 | 0.1589 |
| 2,000 Hz | 0.2239 | 0.2194 | 0.2020 |
| 2,500 Hz | 0.3213 | 0.3124 | 0.2680 |
| 3,150 Hz | 0.4419 | 0.4329 | 0.3738 |
| 4,000 Hz | 0.6055 | 0.5943 | 0.5057 |
| 5,000 Hz | 0.7825 | 0.7649 | 0.6695 |
| 6,300 Hz | 0.8865 | 0.8847 | 0.7861 |
| Bonding strength evaluation | ○ | ○ | x |

Example 7

As shown in FIG. 3, while transferring a surface skin member X (22) at a constant rate with the pile side faced downward, polyethylene powder A (24) was scattered on the surface skin member A (22) at the scattering rate of 350 g/m² from a scattering device 25. Subsequently, the powder A (24) was heated to 140° C. with a heating apparatus 26 and melted. Thereafter, a nonwoven fabric Y (23) was disposed thereon and pressed with water-cooling-type cooling pressure rollers 27 and 27. Thus, a carpet 1 for vehicles was obtained. The air permeability of this carpet 1 in the thickness direction was 17 cm³/cm²·sec.

Example 8

A carpet 1 for vehicles was obtained in the same manner as in Example 7 except that polyethylene powder B was used as the thermoplastic resin powder in place of the polyethylene powder A.

Example 9

A carpet 1 for vehicles was obtained in the same manner as in Example 7 except that polyethylene powder C was used as the thermoplastic resin powder in place of the polyethylene powder A.

Example 10

A carpet 1 for vehicles was obtained in the same manner as in Example 7 except that polyethylene powder D was used as the thermoplastic resin powder in place of the polyethylene powder A.

Example 11

A carpet 1 for vehicles was obtained in the same manner as in Example 7 except that polyethylene powder E was used as the thermoplastic resin powder in place of the polyethylene powder A.

Example 12

A carpet 1 for vehicles was obtained in the same manner as in Example 7 except that polyethylene powder F was used as the thermoplastic resin powder in place of the polyethylene powder A.

Comparative Example 4

A carpet 1 for vehicles was obtained in the same manner as in Example 7 except that polyethylene powder J was used as the thermoplastic resin powder in place of the polyethylene powder A.

Comparative Example 5

A carpet 1 for vehicles was obtained in the same manner as In Example 7 except that polyethylene powder K was used as the thermoplastic resin powder in place of the polyethylene powder A.

Comparative Example 6

A carpet 1 for vehicles was obtained in the same manner as in Example 7 except that polyethylene powder L was used as the thermoplastic resin powder in place of the polyethylene powder

TABLE 3

|  | Comp. Ex. 4 | Comp. Ex. 5 | Ex. 7 | Ex. 8 | Ex. 9 | Ex. 10 |
| --- | --- | --- | --- | --- | --- | --- |
| Particle diameter of polyethylene powder | Less than 75 μm | Larger than 270 μm but smaller than 310 μm | Larger than 330 μm but smaller than 350 μm | Larger than 350 μm but smaller than 450 μm | Larger than 450 μm but smaller than 500 μm | Larger than 500 μm but smaller than 600 μm |
| Powder adhered amount (g/m²) | 400 | 400 | 400 | 400 | 400 | 400 |
| Air permeability (cm³/cm² · sec.) | 4 | 7 | 17 | 18 | 17 | 17 |
| Sound absorption rate |  |  |  |  |  |  |
| 1,000 Hz | 0.1043 | 0.1053 | 0.1170 | 0.1184 | 0.1193 | 0.1204 |
| 1,250 Hz | 0.1158 | 0.1214 | 0.1582 | 0.1546 | 0.1517 | 0.1593 |
| 1,600 Hz | 0.1349 | 0.1336 | 0.1838 | 0.1863 | 0.1882 | 0.1863 |
| 2,000 Hz | 0.1963 | 0.1945 | 0.2460 | 0.2360 | 0.2255 | 0.2469 |
| 2,500 Hz | 0.2530 | 0.2622 | 0.3646 | 0.3583 | 0.3525 | 0.3701 |
| 3,150 Hz | 0.3402 | 0.3535 | 0.5134 | 0.5179 | 0.5219 | 0.5167 |
| 4,000 Hz | 0.3454 | 0.3762 | 0.7045 | 0.7077 | 0.7104 | 0.7069 |
| 5,000 Hz | 0.2618 | 0.2768 | 0.8402 | 0.8416 | 0.8435 | 0.8519 |
| 6,300 Hz | 0.2297 | 0.2443 | 0.8637 | 0.8721 | 0.8800 | 0.8712 |
| Bonding strength evaluation | x | x | ◯ | ◯ | ◯ | ◯ |

TABLE 4

|  | Ex. 11 | Ex. 12 | Comp. Ex. 6 |
|---|---|---|---|
| Particle diameter of polyethylene powder | Larger than 600 μm but smaller than 700 μm | Larger than 700 μm but smaller than 900 μm | Larger than 1,000 μm |
| Powder adhered amount (g/m$^2$) | 400 | 400 | 400 |
| Air permeability (cm$^3$/cm$^2$ · sec.) | 18 | 16 | 28 |
| Sound absorption rate |  |  |  |
| 1,000 Hz | 0.1189 | 0.1180 | 0.0973 |
| 1,250 Hz | 0.1574 | 0.1561 | 0.1232 |
| 1,600 Hz | 0.1828 | 0.1788 | 0.1581 |
| 2,000 Hz | 0.2460 | 0.2444 | 0.1989 |
| 2,500 Hz | 0.3667 | 0.3627 | 0.2653 |
| 3,150 Hz | 0.5112 | 0.5064 | 0.3701 |
| 4,000 Hz | 0.7001 | 0.6927 | 0.4956 |
| 5,000 Hz | 0.8389 | 0.8264 | 0.6662 |
| 6,300 Hz | 0.8627 | 0.8537 | 0.7743 |
| Bonding strength evaluation | ○ | ○ | x |

Example 13

As shown in FIG. 3, while transferring a surface skin member X (22) at a constant rate with the pile side faced downward, polyethylene powder A (24) was scattered on the surface skin member A (22) at the scattering rate of 450 g/m$^2$ from a scattering device 25. Subsequently, the powder A (24) was heated to 140° C. with a heating apparatus 26 and melted. Thereafter, a nonwoven fabric Y (23) was disposed thereon and pressed with water-cooling-type cooling pressure rollers 27 and 27. Thus, a carpet 1 for vehicles was obtained. The air permeability of this carpet 1 in the thickness direction was 10 cm$^3$/cm$^2$·sec.

Example 14

A carpet 1 for vehicles was obtained in the same manner as in Example 13 except that polyethylene powder B was used as the thermoplastic resin powder in place of the polyethylene powder A.

Example 15

A carpet 1 for vehicles was obtained in the same manner as in Example 13 except that polyethylene powder C was used as the thermoplastic resin powder in place of the polyethylene powder A.

Example 16

A carpet 1 for vehicles was obtained in the same manner as in Example 13 except that polyethylene powder D was used as the thermoplastic resin powder in place of the polyethylene powder A.

Example 17

A carpet 1 for vehicles was obtained in the same manner as in Example 13 except that polyethylene powder E was used as the thermoplastic resin powder in place of the polyethylene powder A.

Example 18

A carpet 1 for vehicles was obtained in the same manner as in Example 13 except that polyethylene powder F was used as the thermoplastic resin powder in place of the polyethylene powder A.

Comparative Example 7

A carpet 1 for vehicles was obtained in the same manner as in Example 13 except that polyethylene powder J was used as the thermoplastic resin powder in place of the polyethylene powder A.

Comparative Example 8

A carpet 1 for vehicles was obtained in the same manner as in Example 13 except that polyethylene powder K was used as the thermoplastic resin powder in place of the polyethylene powder A.

Comparative Example 9

A carpet 1 for vehicles was obtained in the same manner as in Example 13 except that polyethylene powder L was used as the thermoplastic resin powder in place of the polyethylene powder A.

TABLE 5

|  | Comp. Ex. 7 | Comp. Ex. 8 | Ex. 13 | Ex. 14 | Ex. 15 | Ex. 16 |
|---|---|---|---|---|---|---|
| Particle diameter of polyethylene powder | Less than 75 μm | Larger than 270 μm but smaller than 310 μm | Larger than 330 μm but smaller than 350 μm | Larger than 350 μm but smaller than 450 μm | Larger than 450 μm but smaller than 500 μm | Larger than 500 μm but smaller than 600 μm |
| Powder adhered amount (g/m$^2$) | 450 | 450 | 450 | 450 | 450 | 450 |
| Air permeability (cm$^3$/cm$^2$ · sec.) | 2 | 4 | 10 | 12 | 14 | 13 |
| Sound absorption rate |  |  |  |  |  |  |
| 1,000 Hz |  | 0.0948 | 0.0957 | 0.1394 | 0.1376 | 0.1353 | 0.1367 |
| 1,250 Hz |  | 0.1053 | 0.1104 | 0.1935 | 0.1895 | 0.1860 | 0.1953 |
| 1,600 Hz |  | 0.1226 | 0.1214 | 0.2400 | 0.2335 | 0.2264 | 0.2242 |
| 2,000 Hz |  | 0.1870 | 0.1852 | 0.3133 | 0.3047 | 0.2955 | 0.3236 |
| 2,500 Hz |  | 0.2200 | 0.2362 | 0.4909 | 0.4811 | 0.4720 | 0.4956 |

TABLE 5-continued

|  | Comp. Ex. 7 | Comp. Ex. 8 | Ex. 13 | Ex. 14 | Ex. 15 | Ex. 16 |
|---|---|---|---|---|---|---|
| 3,150 Hz | 0.2658 | 0.2658 | 0.6599 | 0.6506 | 0.6407 | 0.6342 |
| 4,000 Hz | 0.2678 | 0.2787 | 0.6648 | 0.6789 | 0.6925 | 0.6890 |
| 5,000 Hz | 0.2128 | 0.2097 | 0.5849 | 0.5937 | 0.6030 | 0.6090 |
| 6,300 Hz | 0.1823 | 0.1894 | 0.5564 | 0.5683 | 0.5796 | 0.5738 |
| Bonding strength evaluation | x | Δ | ○ | ○ | ○ | ○ |

TABLE 6

|  | Ex. 17 | Ex. 18 | Comp. Ex. 9 |
|---|---|---|---|
| Particle diameter of polyethylene powder | Larger than 600 μm but smaller than 700 μm | Larger than 700 μm but smaller than 900 μm | Larger than 1,000 μm |
| Powder adhered amount (g/m²) | 450 | 450 | 450 |
| Air permeability (Cm³/cm² · sec.) | 14 | 13 | 32 |
| Sound absorption rate |  |  |  |
| 1,000 Hz | 0.1326 | 0.1366 | 0.0876 |
| 1,250 Hz | 0.1842 | 0.1915 | 0.1133 |
| 1,600 Hz | 0.2196 | 0.2328 | 0.1455 |
| 2,000 Hz | 0.2867 | 0.3039 | 0.1890 |
| 2,500 Hz | 0.4767 | 0.4958 | 0.2494 |
| 3,150 Hz | 0.6535 | 0.6731 | 0.2960 |
| 4,000 Hz | 0.6856 | 0.6847 | 0.3717 |
| 5,000 Hz | 0.6151 | 0.5732 | 0.4397 |
| 6,300 Hz | 0.5969 | 0.5508 | 0.5420 |
| Bonding strength evaluation | ○ | ○ | x |

Comparative Example 10

A carpet 1 for vehicles was obtained in the same manner as in Example 1 except that the scattered amount of the polyethylene powder was 130 g/m².

Comparative Example 11

A carpet 1 for vehicles was obtained in the same manner as in Example 1 except that the scattered amount of the polyethylene powder was 550 g/m².

TABLE 7

|  | Comp. Ex. 10 | Ex. 1 | Ex. 7 | Ex. 13 | Comp. Ex. 11 |
|---|---|---|---|---|---|
| Particle diameter of polyethylene powder | Larger than 330 μm but smaller than 350 μm | Larger than 330 μm but smaller than 350 μm | Larger than 330 μm but smaller than 350 μm | Larger than 330 μm but smaller than 350 μm | Larger than 330 μm but smaller than 350 μm |
| Powder adhered amount (g/m²) | 130 | 250 | 400 | 450 | 550 |
| Air permeability (cm³/cm² · sec.) | 61 | 23 | 17 | 10 | 0.5 or less |
| Sound absorption rate |  |  |  |  |  |
| 1,000 Hz | 0.0809 | 0.1001 | 0.1170 | 0.1394 | 0.0920 |
| 1,250 Hz | 0.1101 | 0.1359 | 0.1582 | 0.1935 | 0.1002 |
| 1,600 Hz | 0.1339 | 0.1775 | 0.1838 | 0.2400 | 0.1156 |
| 2,000 Hz | 0.1454 | 0.2239 | 0.2460 | 0.3133 | 0.1746 |
| 2,500 Hz | 0.1906 | 0.3195 | 0.3646 | 0.4909 | 0.2790 |
| 3,150 Hz | 0.2780 | 0.4438 | 0.5134 | 0.6599 | 0.2530 |
| 4,000 Hz | 0.3591 | 0.6093 | 0.7045 | 0.6648 | 0.2258 |
| 5,000 Hz | 0.3890 | 0.7837 | 0.8402 | 0.5849 | 0.2198 |
| 6,300 Hz | 0.4209 | 0.8874 | 0.8637 | 0.5564 | 0.1842 |
| Bonding strength evaluation | x | ○ | ○ | ○ | x |

Comparative Example 12

A carpet 1 for vehicles was obtained in the same manner as in Example 6 except that the scattered amount of the polyethylene powder was 130 g/m².

Comparative Example 13

A carpet 1 for vehicles was obtained in the same manner as in Example 6 except that the scattered amount of the polyethylene powder was 550 g/m².

TABLE 8

|  | Comp. Ex. 12 | Ex. 6 | Ex. 12 | Ex. 18 | Comp. Ex. 13 |
|---|---|---|---|---|---|
| Particle diameter of polyethylene powder | Larger than 700 μm but smaller than 900 μm | Larger than 700 μm but smaller than 900 μm | Larger than 700 μm but smaller than 900 μm | Larger than 700 μm but smaller than 900 μm | Larger than 700 μm but smaller than 900 μm |
| Powder adhered amount (g/m$^2$) | 130 | 250 | 400 | 450 | 550 |
| Air permeability (cm$^3$/cm$^2$·sec.) | 64 | 25 | 16 | 13 | 38 |
| Sound absorption rate | | | | | |
| 1,000 Hz | 0.0814 | 0.0998 | 0.1180 | 0.1366 | 0.0832 |
| 1,250 Hz | 0.1077 | 0.1358 | 0.1561 | 0.1915 | 0.1020 |
| 1,600 Hz | 0.1288 | 0.1755 | 0.1788 | 0.2328 | 0.1339 |
| 2,000 Hz | 0.1442 | 0.2194 | 0.2444 | 0.3039 | 0.1625 |
| 2,500 Hz | 0.1886 | 0.3124 | 0.3627 | 0.4958 | 0.1995 |
| 3,150 Hz | 0.2734 | 0.4329 | 0.5064 | 0.6731 | 0.2931 |
| 4,000 Hz | 0.3533 | 0.5943 | 0.6927 | 0.6847 | 0.3680 |
| 5,000 Hz | 0.3884 | 0.7649 | 0.8264 | 0.5732 | 0.4133 |
| 6,300 Hz | 0.4098 | 0.8847 | 0.8537 | 0.5508 | 0.4770 |
| Bonding strength evaluation | x | ○ | ○ | ○ | x |

In each of the carpets obtained as mentioned above, the sound absorption performance and the bonding strength were investigated based on the following evaluation methods. The results are shown in Tables 1-8.

<Sound Absorption Property Evaluation Method>

Sound absorption rate was measured in accordance with the perpendicular incidence sound absorption measuring method of ASTEM E1050.

<Bonding Strength Evaluation Method>

In the evaluation, "○" denotes that the bonding strength was 50 N or above. "Δ" denotes that the bonding strength was not less than 20 N but less than 50N, and "x" denotes that the bonding strength was less than 20 N.

As will be apparent from Tables 1-8, in the carpets for vehicles of Examples 1 to 18 of the present invention, the surface skin member and the nonwoven fabric sound absorption layer were bonded with sufficient adhesive strength. Furthermore, in the carpets for vehicles of Examples 1 to 18, since the particle diameter of the thermoplastic resin powder was not smaller than 320 μm but not larger than 1,000 μm and the adhered amount of the thermoplastic resin powder was 180 to 500 g/m$^2$, the air permeability of the carpet for vehicles in the thickness direction thereof was controlled so as to fall within the range of 10 to 26 cm$^3$/cm$^2$·sec. Thus, a carpet excellent in sound absorbing performance and capable of attaining sufficient quietness can be provided. In the carpets for vehicles of Examples 1 to 18, it was especially excellent in sound absorption performance at the frequency of 1,250 to 4,000 Hz.

On the other hand, in the carpets of Comparative Examples 1 to 13 exceeding the scope of the invention, sufficient quietness could not be obtained.

In Comparative Examples 1 and 2, since the scattered amount of the thermoplastic resin powder was set to 250 g/m$^2$ which was a lower value in the range (180 to 500 g/m$^2$) specified by the present invention and the particle diameter of the powder was less than 320 μm, the powder can be easily impregnated in the surface skin member and the nonwoven fabric sound absorption layer. Thus, the air permeability in the thickness direction will exceed 26 cm$^3$/cm$^2$·sec., resulting in insufficient sound absorption performance.

In Comparative Examples 4, 5, 7 and 8, since the scattered amount of the thermoplastic resin powder was set to 400 or 450 g/m$^2$ which was an upper value in the range (180 to 500 g/m$^2$) specified by the present invention and the particle diameter of the powder was less than 320 μm, the scattered powder tends to form a film covering almost the entire surface of the surface skin layer or the nonwoven fabric sound absorption layer. Thus, the air permeability in the thickness direction will be less than 10 cm$^3$/cm$^2$·sec., resulting in insufficient sound absorption performance.

Furthermore, in Comparative Examples 3, 6 and 9, the particle diameter of the thermoplastic resin powder exceeded 1,000 μm. Such rough powder is not easily melted and therefore non-molten powder tends to be remained after heat pressing, resulting in large gaps between powders. As a result, the air permeability of the carpet in the thickness direction thereof exceeds 26 cm$^3$/cm$^2$·sec., which makes it difficult to attain sufficient sound absorption performance.

As explained above, the carpet for vehicles according to the present invention is comprised of a surface skin layer, a sound absorption layer made of a nonwoven fabric integrally bonded to the surface skin layer via an adhesive resin layer, wherein the adhesive resin layer is constituted by an air permeable resin layer formed by melting thermoplastic resin powder having a particle diameter of not smaller than 320 μm but not larger than 1,000 μm, wherein an adhered amount of the thermoplastic resin powder is 180 to 500 g/m$^2$, and wherein air permeability of the entire carpet in a thickness direction thereof is 10 to 26 cm$^3$/cm$^2$·sec. Therefore, a carpet for vehicles having air permeability of the entire carpet in a thickness direction thereof falling within the range of 10 to 26 cm$^3$/cm$^2$·sec. can be provided assuredly. Furthermore, since the air permeability of the entire carpet in the thickness direction thereof is set so as to fall within the range of 10 to 26 cm$^3$/cm$^2$·sec., excellent quietness can be secured assuredly. That is, since the air permeability of the entire carpet in the thickness direction thereof is set to 10 cm$^3$/cm$^2$·sec. or above, noise entered from the upper side can pass through the adhesive resin layer effectively without being bounced by the adhesive resin layer, exerting excellent sound absorbency, which in turn can attain sufficient quietness. In addition, since the air permeability of the entire carpet in the thickness direction is set to 26 cm$^3$/cm$^2$·sec. or less, the carpet can have sufficient air flow resistance against noise entering from the upper side and passing through in the thickness direction. Thus, sound interferential actions of the nonwoven sound absorption fabric can be exerted effectively, resulting in sufficient sound absorption of automobile inside space noise. As a result, excellent quietness can be assuredly secured on any conditions.

In cases where the thickness of the sound absorption layer falls within the range of 0.3 to 15 mm, the areal weight of the layer falls within the range of 10 to 1,000 g/m² and the fineness of the fiber constituting the layer falls within the range of 0.1 to 30 decitex, sufficient sound absorption performance can be exerted at a broad frequency range covering from a lower frequency to a higher frequency.

In cases where polyolefin series resin powder is used as the thermoplastic resin powder, bonding strength can be further increased and recycling can be enhanced.

This application claims priority to Japanese Patent Application No. 2001-396240 filed on Dec. 27, 2001, the disclosure of which is incorporated by reference in its entirety.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "Preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A carpet for vehicles, comprising:
   a surface skin layer; and
   a sound absorption layer made of a nonwoven fabric integrally bonded to the surface skin layer via an adhesive resin layer,
   wherein the adhesive resin layer is constituted by an air permeable resin layer formed by melting thermoplastic resin powder having a particle diameter of not smaller than 320 μm but not larger than 1,000 μm,
   wherein an adhered amount of the thermoplastic resin powder is 180 to 500 g/m², and
   wherein air permeability of the entire carpet in a thickness direction thereof is 10 to 26 cm³/cm²·sec.

2. The carpet for vehicles as recited in claim 1, wherein the adhered amount of the thermoplastic resin powder is 200 to 450 g/m².

3. The carpet for vehicles as recited in claim 1, wherein the air permeability of the entire carpet in the thickness direction thereof falls within the range of 16 to 26 cm³/cm²·sec.

4. The carpet for vehicles as recited in claim 1, wherein a thickness of the sound absorption layer is 0.3 to 15 mm, wherein areal weight of the sound absorption layer is 10 to 1,000 g/m² and wherein fineness of a fiber constituting the sound absorption layer falls within the range of 0.1 to 30 decitex.

5. The carpet for vehicles as recited in claim 1, wherein the thermoplastic resin powder is polyolefin series resin powder.

6. A carpet for vehicles as recited in claim 1 used as an automobile floor carpet.

* * * * *